T. W. KLOMAN.
LOW WATER SAFETY DEVICE.
APPLICATION FILED JAN. 25, 1918.

1,280,762.

Patented Oct. 8, 1918.

INVENTOR
Theodore W. Kloman
BY Charles R. Searle
ATTORNEY

UNITED STATES PATENT OFFICE.

THEODORE W. KLOMAN, OF PARK RIDGE, NEW JERSEY.

LOW-WATER SAFETY DEVICE.

1,280,762.  Specification of Letters Patent.  Patented Oct. 8, 1918.

Application filed January 25, 1918. Serial No. 213,708.

*To all whom it may concern:*

Be it known that I, THEODORE W. KLOMAN, a citizen of the United States, residing at Park Ridge, in the county of Bergen and State of New Jersey, have invented a certain new and useful Improvement in Low-Water Safety Devices, of which the following is a specification.

The invention relates to devices used with water-cooled internal combustion engines, for indicating the lessening of the volume of water, by evaporation or otherwise, to a dangerous extent, and the object of the invention is to provide simple, inexpensive, electrically operated means adapted to act automatically and positively to stop the engine when the water level falls below a predetermined point and thus give an unmistakable signal that the water supply must be replenished, and a further object is to provide means by which the operator may again start the engine and permit it to run temporarily in the dangerous condition until an additional supply can be obtained.

The invention consists in certain novel features, and details of construction and arrangement, by which the above objects are attained, to be hereinafter described and claimed.

The accompanying drawings form a part of this specification and show two approved forms of the invention.

Similar letters of reference indicate like parts in all the figures.

A is the engine of an automobile, B the radiator, and C the elevated return-pipe for water circulated by a pump or otherwise, through the water jackets, radiator and other parts of the cooling system.

D is a screw plug which may be understood as similar in construction to a spark plug of the usual type, having electrodes $M^1$ $M^2$ of disk form, insulated from each other and separated to produce a considerable gap, connected, one, $M^1$, to the binding-post $D^1$ and the other, $M^2$, to the shell of the plug and thus grounded when the plug is connected to a fixed portion of the motor. The adjacent faces of the electrodes are separated far enough to prevent the passage of a spark across the air-gap thus formed.

The plug may be inserted in a suitable hole drilled and tapped to receive it at any suitable location in the upper portion of the cooling system at the level selected as the danger line below which it is unsafe to permit the water to fall while the motor is to be run, and by connecting the plug in the ignition or other active circuit of the electric system controlling the motor, the current will pass practically unobstructedly from one of the electrodes to the other so long as they are submerged, the water serving, by its conductivity to bridge the gap, but when the water level falls below the electrodes and exposes the gap, the current will no longer pass, due to the resistance offered by the air, and the circuit is thus broken and the engine automatically stopped.

Figure 3:
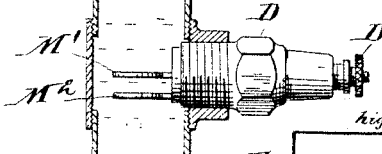
Fig. 3 is a diagram showing a portion of the wiring and apparatus for an automobile, and the relation of such preferred device to one of the circuits.
Figure 3:
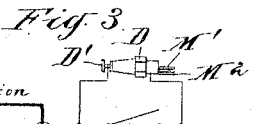

The plug D may be located as shown, in a stand-pipe E mounted on the return-pipe C, having a cap $E^1$ in which is a small orifice $e$ for the admission of air, and the plug is preferably connected in the ground line F, as indicated in Fig. 3. $F^1$ is a switch in the same line, between the electrodes, located conveniently to the hand of the operator, by which the ground line may be again completed when broken by the fall of water level, and the car thus operated and driven to a place of safety at which an additional supply of water may be obtained.

Figure 1:
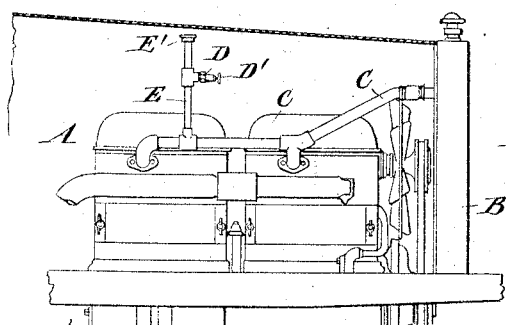
Figure 1 is a side elevation of an internal combustion automobile engine, equipped with a preferred form of the invention, in which the water itself serves as a portion of the electric circuit controlling the operation of the motor.
Figure 2:
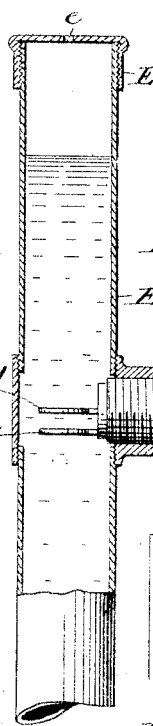
Fig. 2 is an elevation of the same device on a larger scale, with the immediately adjacent portions of the water system shown in vertical section.
Figure 4:
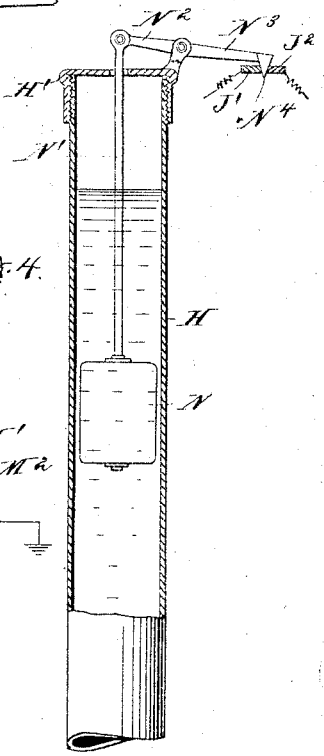
Fig. 4 is an elevation and vertical section, similar to Fig. 2 but showing a modification in which the circuit is broken by the descent of a float moved by changes in the water level in the cooling system.

In the device shown in Fig. 4 a similar stand-pipe H is employed, containing a float N connected by a rod $N^1$ to an arm of a lever $N^2$ pivotally mounted on the cap $H^1$. The other arm $N^3$ carries a wedge-block $N^4$ adapted to fill the gap between the two separated electrodes $J^1$ $J^2$ and maintain the circuit while the float is forced upward by its buoyancy, and to withdraw the block and break the circuit when the water level falls sufficiently to permit the float to descend by gravity.

Figure 5:
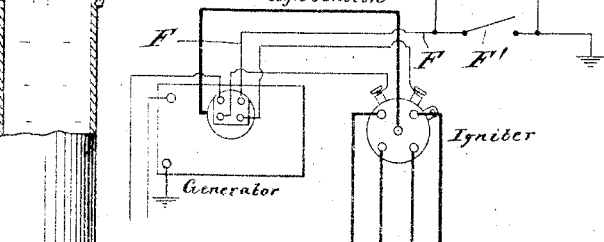
Fig. 5 is a diagram similar to Fig. 3, showing the relation of such float device to one of the circuits.

This arrangement may be preferably in some situations and is shown as connected for service in the high tension line J, as indicated in Fig. 5. As in the form first described, a switch J³ is introduced by which the line may be again completed when broken by the descent of the float.

In both forms the switch is open when the device is in condition for service, and is closed only after the device has stopped the motor, to permit the car to be moved to avoid accidents until the water supply may be replenished.

I claim:—

1. In a motor controlled by an electric circuit, and having a cooling system employing water as the cooling agent, the combination therewith of connections for including such water in such circuit, and an electrode included in such circuit and adapted when submerged in such water to permit the passage of current through such water to complete such circuit, and to break such circuit by the gap formed between such electrode and such water when said electrode is exposed by a fall of water level in said cooling system.

2. In a motor controlled by an electric circuit, a cooling system employing water as a cooling agent, in combination with a plug having separated electrodes extending into such system and included in such circuit, said electrodes adapted when submerged to permit the passage of current from one to the other through the water, and when exposed by the fall of water level, to present a gap sufficient to prevent the passage of such current.

3. In a motor controlled by an electric circuit, a cooling system employing water as a cooling agent, in combination with a plug having separated electrodes extending into such system and included in such circuit, said electrodes adapted when submerged to permit the passage of current from one to the other through the water, and when exposed by the fall of water level, to present a gap sufficient to prevent the passage of such current, and a switch for again completing such circuit when thus broken.

In testimony that I claim the invention above set forth I affix my signature, in presence of two witnesses.

THEODORE W. KLOMAN.